United States Patent [19]
Cocks

[11] Patent Number: 5,092,503
[45] Date of Patent: Mar. 3, 1992

[54] CARRIER FOR A MOTOR VEHICLE

[76] Inventor: Andrew P. Cocks, Bryanston, South Africa

[21] Appl. No.: 523,247

[22] Filed: May 14, 1990

[30] Foreign Application Priority Data

May 12, 1989 [ZA] South Africa ............... 89/3561

[51] Int. Cl.⁵ ............... B60R 9/00; B60R 7/00
[52] U.S. Cl. ............... 224/42.44; 224/42.07; 224/42.45 R
[58] Field of Search ......... 224/42.44, 42.43, 42.45 R, 224/42.41, 42.07, 42.08; 280/769; 296/37.1, 37.2

[56] References Cited

U.S. PATENT DOCUMENTS

| | | | |
|---|---|---|---|
| 1,415,244 | 5/1922 | Kennedy | 224/42.44 |
| 2,541,244 | 2/1951 | Hack | 296/37.1 |
| 2,593,908 | 4/1952 | Monteverde | 224/42.08 |
| 3,690,526 | 9/1972 | Bundel | 224/42.43 |
| 3,937,376 | 2/1976 | Ewing | 224/42.44 |
| 4,744,590 | 5/1988 | Chesney | 224/42.08 |
| 4,756,457 | 7/1988 | Polk | 224/42.08 |
| 4,799,609 | 1/1989 | Castilla | 224/42.43 |

FOREIGN PATENT DOCUMENTS

| | | | |
|---|---|---|---|
| 439838 | 6/1913 | France | 224/42.07 |
| 556603 | 4/1923 | France | 224/42.07 |
| 266898 | 3/1927 | United Kingdom | 224/42.44 |

Primary Examiner—Henry J. Recla
Assistant Examiner—Keith Kupferschmid
Attorney, Agent, or Firm—Cushman, Darby & Cushman

[57] ABSTRACT

A carrier for attachment to a vehicle, comprising a bracket releaseably securable to a tow bar bracket on the vehicle. A platform is pivotably attached to the bracket and is movable between an upright position for stowage and a horizontal position in which it can receive a load. A pair of extensible arms are connected between the platform and a pair of parallel rods, extending beneath the platform and forming part of the bracket, to control the movement of the platform. The pair of parallel rods are received by channels on a tow bar bracket on the vehicle, and the two brackets can be locked together.

3 Claims, 2 Drawing Sheets

CARRIER FOR A MOTOR VEHICLE

BACKGROUND TO THE INVENTION

This invention relates to a carrier for attachment to a motor vehicle.

Owners of motor vehicles and in particular motor cars may be faced with the problem of transporting bulky or dirty items with their vehicles. Cars often have limited space in the luggage compartment or boot and access to the back seat is restricted by the size of the door opening. This is particularly true of sports cars.

Furthermore, an owner is naturally reluctant to transport any form of dirty or smelly object such as a bag of garden refuse inside his car.

Some vehicles are provided with racks attached to their roofs. These racks, however, offer additional wind resistance when travelling, may be unsightly and have the disadvantage that it is difficult to lift bulky or heavy items up to and onto them.

SUMMARY OF THE INVENTION

According to the invention a carrier for attachment to a motor vehicle comprises a bracket adapted to be secured releasably to support means on the vehicle; a platform attached pivotably to the bracket and movable between a first, upright position for storage and a second generally horizontal position in which it can receive a load; and at least one extensible support arm, connected pivotally between the platform and a point on the bracket located beneath the platform, the extensible arm being adapted to control the movement of the platform when the latter is moved between the first and second positions.

The bracket may include a mounting formation which is adapted to be received by a complemental formation of a support means on the vehicle, both the mounting formation and the complemental formation being orientated so that the carrier is retained in position on the support means by its own weight.

The mounting formation may comprise a pair of parallel rods projecting from the bracket, the complemental formation comprising a pair of channels adapted to receive the rods.

The complemental formation can be formed on a bracket adapted for securement onto a tow hitch of the vehicle.

The extensible arms may be gas-damped telescopic struts.

To comply with the relevant road ordinances and legislation the carrier can be provided with a registration number plate corresponding to that of the motor vehicle, and tail lights. The number plate and tail lights may be individually or jointly mounted onto a pivotable support on the platform to enable correct orientation to supplement the number plate and lights of the vehicle.

DESCRIPTION OF EMBODIMENTS

Figure 1:
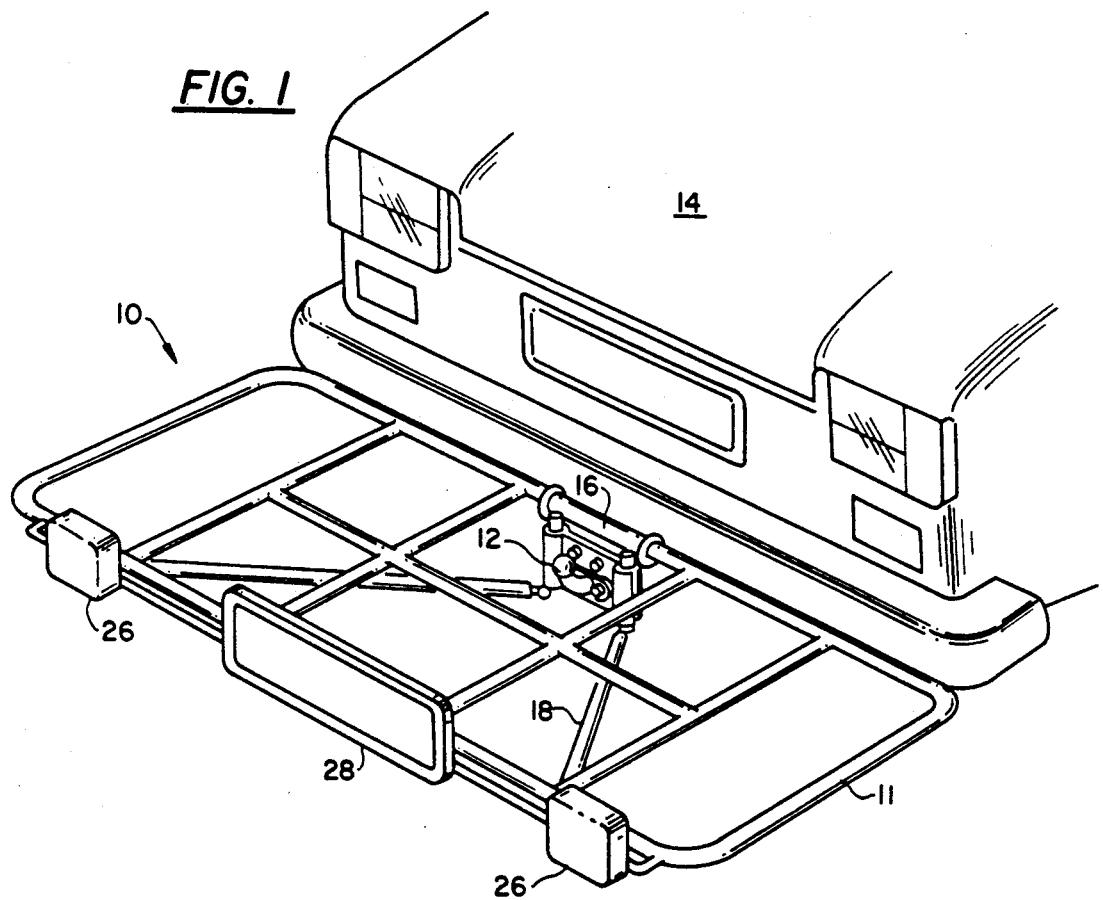
FIG. 1 is a pictorial view of the carrier of the invention attached to the tow hitch of a motor vehicle.
Figure 2:
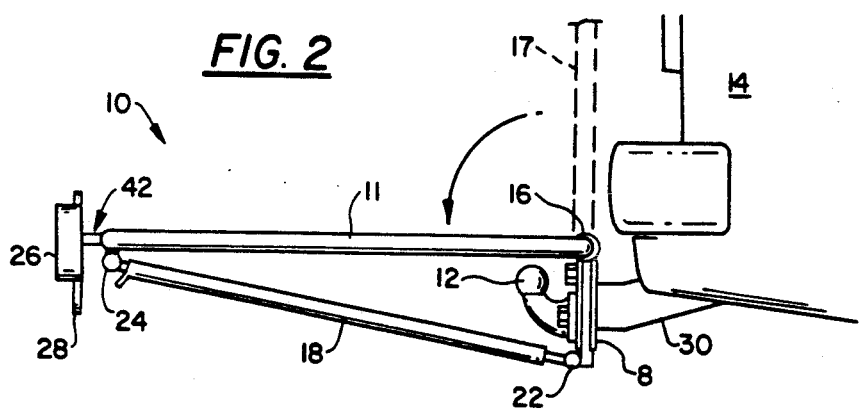
FIG. 2 is a side view of the carrier in FIG. 1.
Figure 3:
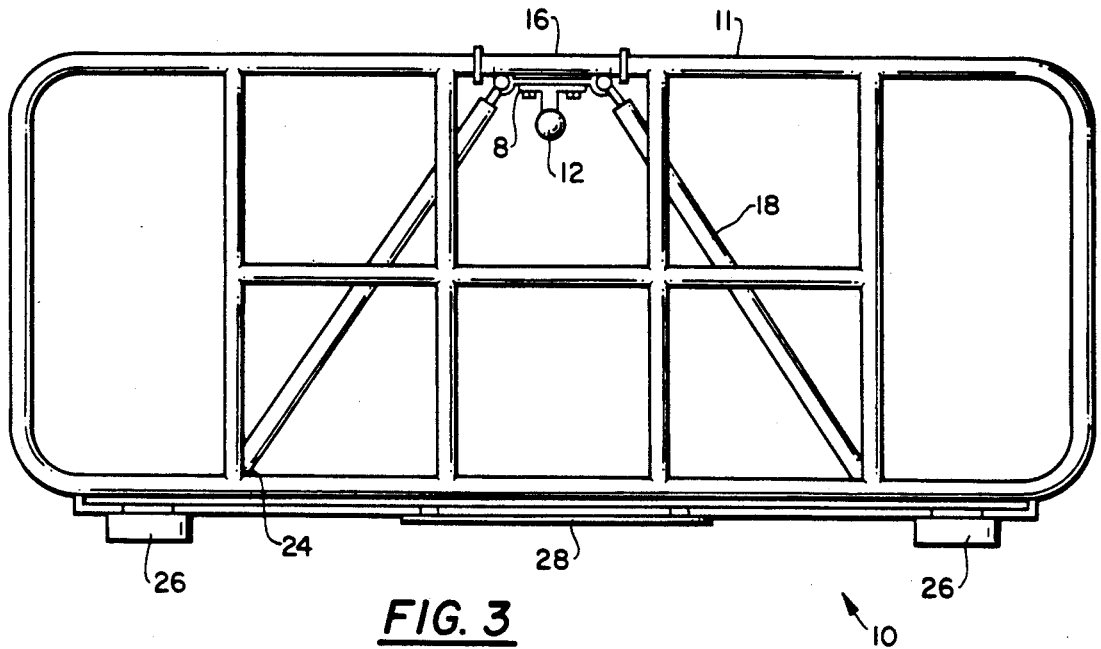
FIG. 3 is a top plan view of the carrier in FIG. 1.

In FIGS. 1 and 2 a carrier 10 is shown to be pivotably mounted onto a tow hitch 12 of a motor vehicle 14.

The carrier 10 has a platform 11 attached pivotally to a carrier bracket 16 mounted to a tow hitch bracket 8 which is bolted to the tow hitch 12.

The pivotal connection to the bracket 16 permits the platform 11 to move from a horizontal "in-use" position to a vertical storage position as shown by the dashed lines 17 in FIG. 2.

The platform 11 is supported in the horizontal position by two extensible struts 18. The struts 18 may be in the form of gas springs, such as gas-damped shock absorbers, or in a less preferred version may be conventional telescopic arms. One end of each of the struts 18 is pivotably connected to the bracket 8 by means of respective universal joints 22 located below the hinged connection 16. From the joints 22 the struts 18 diverge and meet the platform 11 at respective hinged connections 24.

When the platform 11 is pivoted into the vertical position the struts, or gas springs 18, assist in lifting the carrier, extending to actively support the carrier in that position. A locking device such as a clip (not shown) can be provided to lock the gas springs 18 in their extended position. Releasing the locking device allows the carrier 10 to be moved back into the horizontal position. The gas springs 18 allow the carrier to be moved back in a controlled fashion.

To comply with the relevant road ordinances and related legislation the platform 11 is fitted with a pair of tail lights 26 and a registration number plate 28 corresponding to that of the vehicle 14 to which the carrier 10 is attached. Furthermore, the number plate 28 and tail lights 26 may be individually or jointly mounted onto a pivotable support 42 on the platform, as schematically shown in FIG. 2, to enable correct orientation. Any suitable pivotable support could be used, as will readily apparent to one of ordinary skill. The tail lights 26 are connected to the tail lights of the vehicle 14 via an auxiliary electrical connector, in much the same way as a convention trailer's tail lights are connected.

Figure 4:
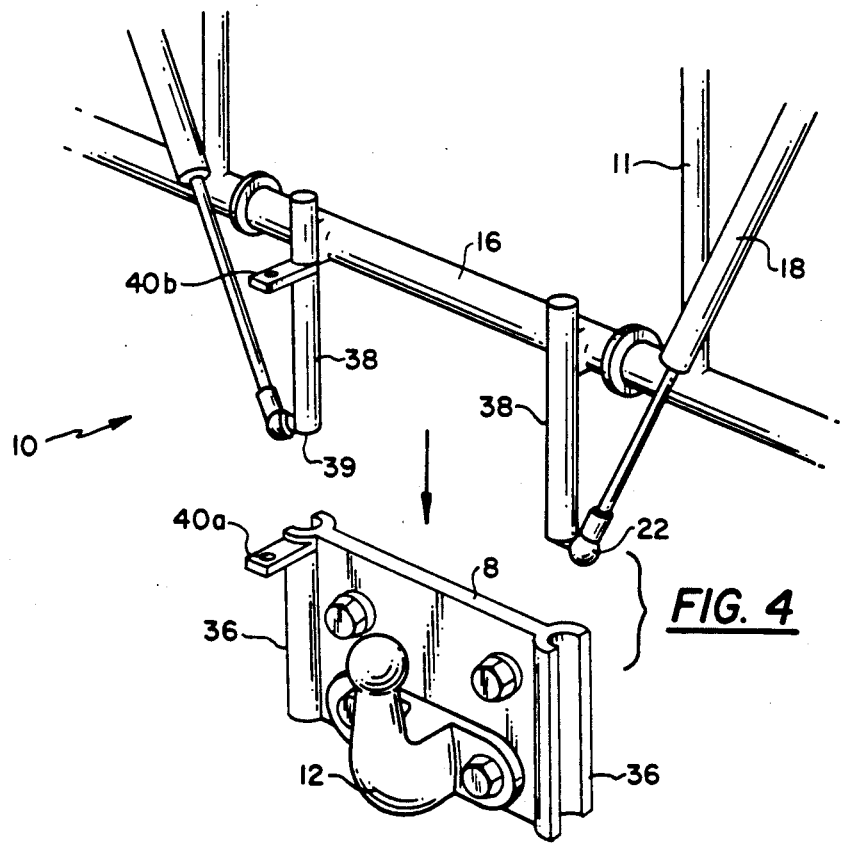
FIG. 4 is an exploded pictorial view showing the attachment of the carrier to the tow hitch.

FIG. 4 shows how the carrier 10 is attached to the tow hitch.

The tow hitch bracket 8 comprises a mounting plate which is bolted to a tow bar 30 just behind the tow hitch 12. The bracket 8 is provided with two channel-shaped slides 36. These slides 36 are adapted to receive and hold pins 38 which extend downwardly from the carrier bracket 16. The ball 39 of the ball-and-socket universal joint 22 is welded to the lower end of the pins 38.

To mount the carrier on the tow hitch bracket 8, the pins 38 are slid into the slides 36, into which they fit snugly. To remove the carrier 10, the reverse process is carried out i.e. the carrier 10 is lifted so that the pins 38 slide out of the slides 36.

The carrier 10 can be secured onto the tow hitch bracket by locking two tabs 40a and 40b together. One tab 40a is welded onto the bracket 8 and the other tab 40b is welded onto one of the pins 38. This prevents unauthorised removal of the carrier 10 and also serves to secure the carrier 10 on the bracket 8 in use.

A principal advantage of the carrier rack of the invention is that the struts 18 extend beneath, rather than above the deck of the platform 11, thereby not obstructing any load which is placed on the platform, and allowing unhindered access to the boot of the vehicle. Furthermore, as the struts support the platform 11 from below, they are subjected to more easily withstandable compression forces when the platform is loaded, rather than tensile forces, which would exist on struts extending above the rack. No additional extension is required for an anchor point for the struts at the fixed end of the platform 11. The extension for the universal joints already exists, in the form of the pins 38.

The slide arrangement constituted by the pins 38 and the slides 36 facilitate the mounting and demounting of the carrier 10. No modifications are required to be made to the vehicle itself. The tow hitch, which is itself a bolt-on attachment, is merely modified slightly by inclusion of the slides 36.

I claim:

1. A carrier for attachment to the rear end of a vehicle comprising:
   (a) a carrier bracket incorporating a pair of mounting rods which are adapted to be releaseably secured to a pair of complementary socket formations on a tow hitch bracket which is operatively fixed to the rear end of the vehicle;
   (b) a platform pivotably attached to the carrier bracket and movable between a first, upright position for storage and a second generally horizontal position for receiving a load; and
   (c) a pair of extensible support arms pivotably connected between the platform and points on the bracket located beneath the platform, the support arms controlling movement of the platform when it is moved between the first and the second positions.

2. A carrier as claimed in claim 1, in which the mounting points on the bracket are located towards the operatively lower ends of the mounting rods.

3. A carrier as claimed in claim 1, in which the support arms are in the form of gas-damped struts.

* * * * *